United States Patent
Appalucci et al.

[11] Patent Number: 5,241,299
[45] Date of Patent: * Aug. 31, 1993

[54] STABILIZED RESONANT TAG CIRCUIT

[75] Inventors: Lawrence C. Appalucci, Villanova, Pa.; Luis F. Ortiz, Ponce, P.R.; Gary T. Mazoki, Sewell, N.J.

[73] Assignee: Checkpoint Systems, Inc., Thorofare, N.J.

[*] Notice: The portion of the term of this patent subsequent to Aug. 25, 2009 has been disclaimed.

[21] Appl. No.: 877,494

[22] Filed: Apr. 30, 1992

Related U.S. Application Data

[63] Continuation-in-part of Ser. No. 703,932, May 22, 1991, Pat. No. 5,142,270.

[51] Int. Cl.5 .................. G08B 13/14; H01Q 1/36
[52] U.S. Cl. ............................ 340/572; 343/895
[58] Field of Search ............... 340/572; 343/895; 333/175, 185; 336/200; 29/846, 842, 831, 829, 825; 156/274.2, 273.9, 272.2; 361/402, 395, 397–400; 427/96, 117, 123, 116

[56] References Cited

U.S. PATENT DOCUMENTS

| | | | |
|---|---|---|---|
| 3,913,219 | 10/1975 | Lichtblau | 29/592 |
| 4,021,705 | 5/1977 | Lichtblau | 361/402 |
| 4,250,398 | 2/1981 | Ellis et al. | 219/549 |
| 4,369,557 | 1/1983 | Vandebult | 29/25.42 |
| 4,413,254 | 11/1983 | Pinneo et al. | 340/572 |
| 4,471,344 | 9/1984 | Williams | 340/572 |
| 4,498,076 | 2/1985 | Lichtblau | 340/572 |
| 4,598,276 | 7/1986 | Tait | 340/572 |
| 4,700,179 | 10/1987 | Fancher | 340/572 |
| 4,717,438 | 1/1988 | Benge et al. | 156/152 |
| 4,778,552 | 10/1988 | Benge et al. | 156/272.2 |
| 4,783,646 | 11/1988 | Matsuzaki | 340/572 |
| 4,792,790 | 12/1988 | Reeb | 340/572 |
| 4,802,944 | 2/1989 | Benge | 156/247 |
| 4,818,312 | 4/1989 | Benge | 156/62 |
| 4,823,234 | 4/1989 | Konishi et al. | 361/395 X |
| 4,843,404 | 6/1989 | Benge et al. | 343/895 |
| 4,846,922 | 7/1989 | Benge et al. | 156/324 |
| 4,864,280 | 9/1989 | van der Meij | 340/572 |
| 4,910,499 | 3/1990 | Benge et al. | 340/572 |
| 4,940,966 | 7/1990 | Pettigrew et al. | 340/551 |
| 4,954,814 | 9/1990 | Benge | 340/572 |
| 4,960,651 | 10/1990 | Pettigrew et al. | 340/572 X |
| 4,990,891 | 2/1991 | Reeb | 340/572 |
| 5,142,270 | 8/1992 | Appalucci et al. | 340/572 |

Primary Examiner—Thomas Mullen
Attorney, Agent, or Firm—Panitch Schwarze Jacobs & Nadel

[57] ABSTRACT

The present invention is a stabilized resonant tag circuit for use as an electronic article surveillance tag. The tag has a flexible substantially planar dielectric substrate having conductors positioned on either side, at least one of the conductors including an inductor. The tag is stabilized by a flexible, substantially planar, tear-resistant, substantially vapor impermeable polymeric film adhered to and covering each of the conductors and the substrate. The film provides a vapor barrier which minimizes the effects of body and article detuning on the circuit and promotes the secured integrity of the tag. The tag circuit may include an indented portion in at least one of the conductors which permits the tag to be deactivated in response to an electromagnetic field of sufficient energy to destroy the resonant properties of the circuit.

13 Claims, 2 Drawing Sheets

STABILIZED RESONANT TAG CIRCUIT

CROSS REFERENCE TO RELATED APPLICATION

This application is a continuation-in-part of copending U.S. patent application Ser. No. 07/703,932, filed May 22, 1991, now U.S. Pat. No. 5,142,270 issued Aug. 25, 1992.

FIELD OF THE INVENTION

The invention relates to resonant tag circuits for electronic article surveillance systems and, more particularly, to stabilization of such tags.

BACKGROUND OF THE INVENTION

Electronic article surveillance (EAS) systems help to deter the unauthorized removal of articles from a surveillance area. One aspect of this deterrence results from the visual observance of a component of an EAS system attached to an article to be protected, namely a resonant tag circuit attached to a particular article. Typical EAS systems involve passing articles having EAS tags attached thereto through an electromagnetic field of predetermined frequency generated in a controlled area. The tag circuit resonates at the frequency of the electromagnetic field, enabling the receiving component of an EAS system to detect the presence of the tag in the controlled area and indicate unauthorized removal of the tagged article from the protected premises. The legitimate removal of tagged articles from the premises may be accomplished by removal or deactivation of the tag circuit before the article is passed through the electromagnetic field.

Typical resonant tag circuits comprise a central dielectric layer and conductive layers on either side of the dielectric layer. For example, U.S. Pat. No. 4,598,276 discloses an EAS marker having a central dielectric layer and conductive spirals on opposite surfaces of the dielectric layer, including an inductive component, the resulting circuit resonating upon exposure to an electromagnetic field of a predetermined frequency.

In addition to the basic component layers of EAS tags described above, various outer or covering layers may be provided over the conductive layers. For example, U.S. Pat. Nos. 4,717,438 and 4,843,404 disclose tags having additional outer layers of an unspecified material and a release sheet attached by means of an adhesive; U.S. Pat. No. 4,792,790 discloses a tag having outer layers of a light-transparent carrier material; and U.S. Pat. No. 4,413,254 discloses a tag having outer cover layers of paper or another insulating material.

Further, U.S. Pat. No. 4,369,557 discloses a tag having outer layers formed of an insulative substrate web having a low dissipation factor at a given frequency and a stable dielectric constant, such as polyethylene, polypropylene, polyester (Mylar), or polyisobutylene. The preferred web material disclosed is polyethylene because of its low cost and ease of bonding with aluminum foil.

Still further examples include U.S. Pat. No. 4,864,280 which discloses a tag having outer layers, one layer being an adhesive film and detachable cover sheet and the opposite layer being a paper film or film of synthetic plastics material. The possibility of printing on the latter layer is also discussed. U.S. Pat. No. 4,783,646 discloses a tag having outer polyester films for use as an insulating covering material which is less expensive than polyimide and facilitates the transmission of radio waves.

The prior art fails to recognize many unexpected advantages arising from the selection of a polymeric material as an outer layer for an EAS tag, such as those advantages associated with a process including indenting or dimpling to fabricate deactivatable tags.

Deactivatable EAS tags are disclosed in U.S. Pat. No. 4,498,076, which is hereby incorporated by reference. This patent discloses deactivatable resonant tag circuits in which a portion of one conductor is indented into the central substrate layer such that the conductors on either side of the substrate are closer to each other at the indented portion than the remainder of the conductors. The tag is deactivated upon exposure to an electromagnetic field of a predetermined frequency, which causes an arc discharge between the conductors through the substrate at the indented portion. The electric arc vaporizes a portion of the conductors near the indented portion, thereby destroying the conductive path and deactivating the circuit. Alternatively, the arc forms a plasma with deposited metal between the conductors which permanently short-circuits the conductors and destroys the resonant properties of the circuit.

Other examples of deactivatable tags are disclosed in the prior art, such as U.S. Pat. No. 4,021,705, which discloses a deactivatable tag having a central layer of electrically insulative material with layers on either side of conductive material and at least one fusible link which can be fused by application of an energizing field to activate or alter the characteristics of the resonant circuit.

Further, U.S. Pat. Nos. 4,778,552, 4,802,944, 4,818,312, 4,846,922, 4,910,499, and 4,954,814 disclose deactivatable tags having an internal non-conductive layer between two conductive layers and outer layers and a release sheet releasably adhered by an adhesive to one of the outer layers.

In some situations, prior art tag circuits may be detuned by contact between the tag and the article to which the tag is secured. For example, meat is typically packaged in a breathable polymeric stretch film which permits liquid or gas, such as oxygen, to pass therethrough. The oxygen which penetrates the film causes the meat packaged therein to have a bright red color associated with freshness. However, the tag circuit may be detuned by capacitance coupling of the inductor with the article. There is a need in the art for a stabilized resonant tag circuit and deactivator in which detuning of the tag circuit by contact with the article or moisture on the article or packaging surface is minimized.

SUMMARY OF THE INVENTION

According to the present invention, a resonant tag circuit is provided for use as an electronic article surveillance tag, having a flexible substantially planar dielectric substrate. A first conductor is positioned on the first side of the dielectric substrate, and a second conductor is positioned on the second side of the dielectric substrate, while at least one of the conductors comprises an inductor. A flexible, substantially planar, tear resistant, substantially vapor impermeable polymeric film is adhered to and covers each of the conductors and the substrate on the side of each conductor opposite to the side which is positioned on the dielectric substrate. The film provides a substantially impermeable vapor barrier for the tag, whereby effects of body and article detuning on the circuit are minimized and the secured integrity of the tag is promoted while maintaining the flexibility thereof.

In addition, the resonant tag circuit may include means for deactivating the circuit in response to an electromagnetic field of sufficient energy to destroy the resonant properties of the circuit. The deactivating means includes a portion of at least one of the conductors which is indented into the substrate such that the conductors are closer to each other at the indented portion than at the remainder of the conductor. In addition, as described below, the polymeric film provides unexpected advantages in the formation of the deactivation means in the tag.

BRIEF DESCRIPTION OF THE DRAWINGS

The foregoing summary, as well as the following detailed description of the preferred embodiments, will be better understood when read in conjunction with the appended drawings. For the purpose of illustrating the invention, there are shown in the drawings embodiments which are presently preferred, it being understood, however, that the invention is not limited to the specific arrangements and instrumentalities disclosed. In the drawings.

DETAILED DESCRIPTION OF THE PREFERRED EMBODIMENT

Figure 1:
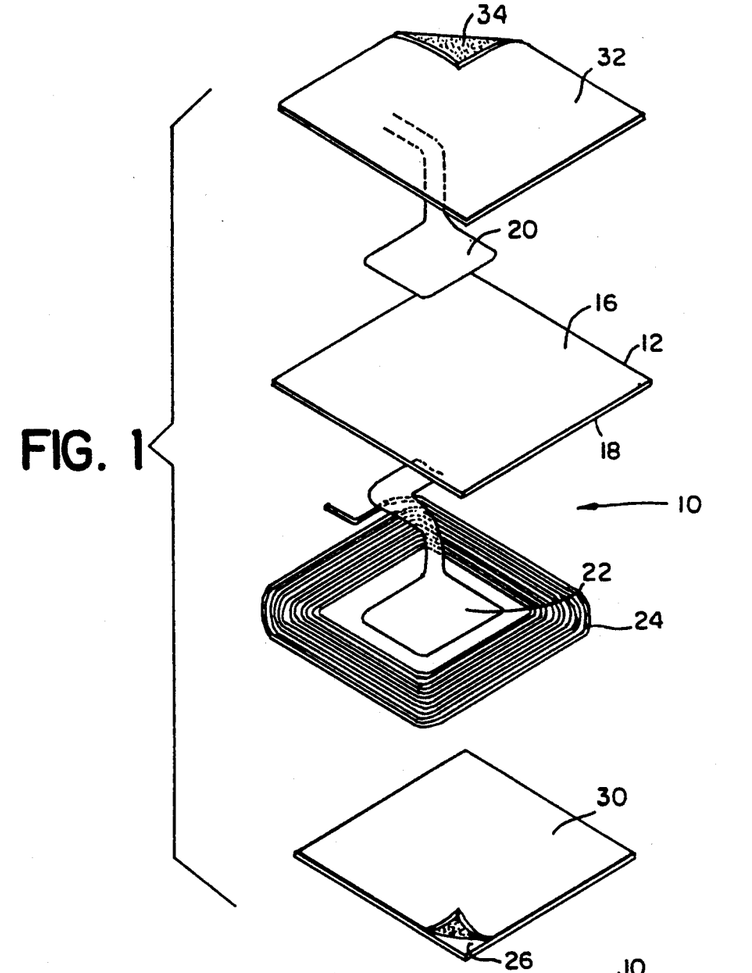
FIG. 1 is a an exploded perspective view of an electronic article surveillance tag in accordance with the present invention.
Figure 2:
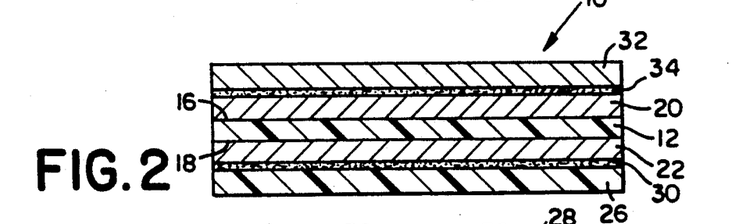
FIG. 2 is a cross-sectional view of a portion of an electronic article surveillance tag in accordance with the present invention.

Referring to the drawings, wherein like numerals indicate like elements throughout, there is shown in FIGS. 1 and 2 a preferred embodiment of a resonant tag circuit, generally designated 10, for use as an electronic article surveillance tag in accordance with the present invention.

Referring now to FIG. 1, the resonant tag circuit 10 includes a dielectric substrate 12. In the present embodiment, the dielectric substrate 12 is preferably both flexible and substantially planar. The aforementioned characteristics of the dielectric substrate are particularly useful in fabrication of the resonant tag circuit 10, enabling a series of tags 10 to be fabricated from a continuous web, as is well-known in the art. Flexibility also allows the resonant tag circuit 10 to be attached to a variety of articles (not shown) or bodies (not shown) having non-planar surfaces.

In the present embodiment, the dielectric substrate 12 is made from a polymeric material, preferably polyethylene. However, it will be recognized by those skilled in the art that the dielectric substrate 12 may be made from a variety of polymeric materials, including polyvinyl chloride, polystyrene, and other engineering thermoplastics which will be evident to those skilled in the art.

As best shown in FIG. 1, the dielectric substrate 12 includes a first side 16 and a second side 18. A first conductor 20 is positioned on the first side 16 of the dielectric substrate 12. The resonant tag circuit 10 further includes a second conductor 22 positioned on the second side 18 of the dielectric substrate 12. At least one of the conductors 20, 22 further includes an inductor 24.

The first and second conductors 20, 22 together form an inductive-capacitance circuit.

In the present embodiment, it is preferred that each of the conductors 20, 22 be substantially planar and flexible. The conductors 20, 22 are preferably made from aluminum, specifically aluminum foil. However one of ordinary skill in the art would understand that other conductive materials, such as copper or nickel, may be used for the conductors 20, 22. Further, one of ordinary skill in the art would understand that the conductors 20, 22 may be made from different conductive materials. The preferred thickness of the conductors 20, 22 is approximately 3 mils, although the conductors 20, 22 may be of any thickness in keeping with the spirit and scope of the present invention.

It is preferred that the inductor 24 be generally formed in a spiral path surrounding the conductive portion of the conductor 22, as best shown in FIG. 1, although the inductor 24 may be formed in other configurations.

The conductors 20, 22 are preferably formed on the first and second sides 16, 18 of the dielectric substrate 12 by an extrusion coating process (not shown). One of ordinary skill in the art would understand that the process of forming the basic tag structure comprising the conductors 20, 22 and the inductor 24 on the dielectric substrate 12 is not specifically pertinent to an understanding of the present invention and is well known in the prior art. Further description of this part of the fabrication process is not believed to be necessary nor is it limiting.

As best shown in FIG. 1, the resonant tag circuit 10 of the invention includes polymeric films 27, 26 adhered to and covering each conductor 20, 22. The first polymeric film 27 is adhered to and covers the conductor 20 and side 16 of dielectric substrate 12. The second polymeric film 26 is adhered to and covers the conductor 22, inductor 24 and side 18 of dielectric substrate 12.

The polymeric films 27, 26 are preferably both flexible and substantially planar to facilitate fabrication of the resonant tag circuit 10 and adherence of the tag 10 to non-planar surfaces on a wide variety of articles and bodies (not shown) to be protected by an electronic article surveillance system. Preferably, the polymeric films 27, 26 are also tear resistant, thus promoting the secured integrity of the tag 10 while maintaining the flexibility thereof.

It is preferred that the polymeric films 27, 26 provide a vapor barrier for the adjacent conductor 20 or 22 and dielectric substrate 12, thus eliminating the need for a film overlaminate. The polymeric films 27, 26 preferably have a moisture absorption less than 0.8% as measured in accordance with ASTM D570-63. The low moisture absorption is particularly advantageous in that a smooth, wrinkle-free printing surface and substantially consistent heat transfer properties are maintained which provide for easier fabrication of resonant tag circuits 28.

Another advantage of the present stabilized tag circuit is that it resists detuning of the circuit which occurs as a result of capacitance coupling of the inductor with the article or an animal body. For example, as previously mentioned, meat is typically packaged in permeable polymeric film. Packaging film having water adsorbed therein has a lower impedance compared to an equivalent film without water. When a typical prior art tag is placed on the meat package, the tag circuit may be detuned by the meat (i.e., article detuning). Further, detuning may occur as a result of handling (body contact) of the tag circuit by persons applying the tag or persons inspecting the article (i.e., body detuning). In the present invention, the polymeric film 27 provides a substantially impermeable barrier which inhibits both article and body detuning of the tag circuit.

Another example of a situation in which use of the present tag would be advantageous is in wrist or ankle bands typically used in hospitals to identify patients. For example, in a nursery, the present tag may be used in an identification band to inhibit removal of infants from a secured area. Typical prior art tags, when used in such applications, may suffer from circuit detuning because of a lack of a barrier between the circuit and the patient's skin. The polymeric film 27 of the present invention provides a barrier layer which minimizes circuit detuning to improve circuit performance.

It is also preferred that the polymeric films 27, 26 have a tensile strength greater than 26,000 psi in the machine direction as measured in accordance with ASTM D882-80. The high tensile strength is indicative of the properties inherent to polymeric materials which contribute to the tear resistance of the polymeric films 27, 26 and promote the secured integrity of the resonant tag circuit 10 while maintaining the requisite flexibility thereof. High tensile strength also allows use of polymeric films 27, 26 having thicknesses of less than about 2 mils, i.e., less than the thickness of paper used as outer layers in tags disclosed in the prior art.

Those skilled in the art would recognize the prior art practice of adhering paper to both sides of the resonant tag circuit 10 to cover the conductors 20, 22 and stabilize the laminate. Typically, the thickness of such paper is on the order of 3.5 to 4 mils. In contrast, the polymeric films 27, 26 of the present invention may each have a thickness not greater than about 2 mils and preferably less than about 1 mil. By using outer layers of polymeric film 27, 26 on both sides of the tag 10 instead of paper layers, the total thickness of the tag may be reduced to less than about 12 mils.

The polymeric films 27, 26 are preferably made from polyester, although one of ordinary skill in the art understands that other polymeric materials such as polyethylene, polyvinyl chloride, and other plastics may be used. The polymeric films 27, 26 may be made from the same or different polymeric materials, as desired. For example, the polymeric film 26 may be made from polyethylene while the polymeric film 27 may be made from polyvinyl chloride. Preferably, the polymeric films 27, 26 are made from the same material.

Suitable polyester films 27, 26 may include, for example, Mylar, which is commercially available from E. I. DuPont de Nemours & Co., Inc. of Wilmington, Del. Mylar is available in a variety of colors. The fabrication of resonant tag circuits 10 using a variety of colored Mylars may be advantageous in that different colored Mylars could provide visual differentiation among tags which resonate at different frequencies. An outer layer of thermal printing paper (not shown) may be added to the layer of Mylar which allows the tags to be printed upon in thermal printers.

A preferred polyester film 27 or 26 is Melinex, which is commercially available from ICI Americas Inc. of Wilmington, Del. Melinex is preferred because it has adequate gas/liquid impermeability, as well as sufficient flexibility, and strength at a gauge thickness less than about 1 mil.

Use of the polymeric films 27, 26 in the tag 10 is advantageous in that the polymeric films 27, 26 resist warping or shrinkage, thereby providing a substantially smooth, wrinkle-free printing surface opposite the conductor 22. The smooth, wrinkle-free printing surfaces which result from use of the polymeric films 27, 26 facilitate printing of prices and other information on the tag 10. The use of polymeric films 27, 26 allows the tags 10 to be printed upon in thermal, laser, and other printers having minimal printing clearances in which it was previously not possible to print on a paper-covered tag. The thinner, more pliable tag 10 also reduces the pressure on printer heads.

Where a non-thermal printer is to be used, the polymeric film may be coated with a layer which accepts inks or toners for non-thermal printing. Such a printable film is the commercially available product 200 Dukote CITC (DK-393) of Dunmore Corp. of Newtown, Pa., which is a specially coated Melinex film.

The resonant tag circuit 10 further includes adhesive layers 30 which adhere each polymeric film 27, 26 to each respective conductor 20, 22 and side 16, 18 of the substrate 12. It is preferred that the adhesive layers 30 each have a thickness not greater than about 1.5 mils, and preferably in the range of about 0.5 to 1.5 mils.

Preferably, the resonant tag circuit 10 further includes a release liner 32, such as paper or plastic film, which is releasably adhered by a pressure sensitive adhesive 34 to the polymeric film 27 on the opposite side from the conductor 20 and substrate 12. The release liner 32 is removed from the tag 10 prior to attachment of the tag 10 to the article to be protected. It is preferred that the release liner 32 have a thickness not greater than about 3.5 mils, although a release liner having a thickness greater than 3.5 mils could be used in conjunction with the present tag 10.

Figure 3:
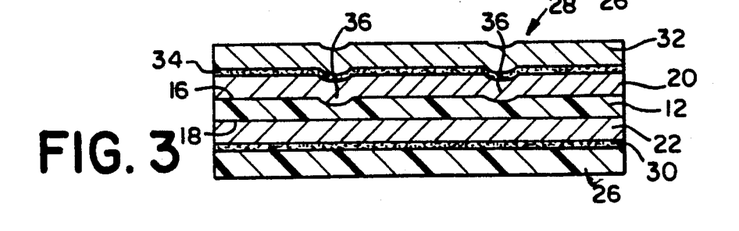
FIG. 3 is a cross-sectional view of a portion of a deactivatable electronic article surveillance tag in accordance with the present invention.

Another aspect of the invention relates to use of polymeric films 27, 26 as outer layers for a deactivatable resonant tag circuit 28, best shown in FIG. 3. The deactivatable resonant tag circuit 28 is substantially similar to the resonant tag circuit 10, however the deactivatable tag 28 further includes means for deactivating the tag 28 in response to an electromagnetic field (not shown) of sufficient energy to destroy the resonant properties of the tag circuit 28. The deactivating means comprises an indented portion or portions 36 (sometimes referred to as "dimples") of the conductor 22 which is indented into the substrate 12 such that the conductors 20, 22 are closer to each other at the indented portion 36 than over the remainder of the conductor 22. One of ordinary skill in the art would understand that either or both of the conductors 20, 22 may be indented into the substrate 12 in keeping with the spirit and scope of the invention.

The deactivatable resonant tag circuit 28 is destroyed by an arc discharge (not shown) between the conductors 20, 22 and through the substrate 12 at the indented portion 36. The electric arc vaporizes a portion (not shown) of the conductors 20, 22 proximate the indented portion 36, thereby destroying the conductive path and deactivating the circuit. Alternatively, the arc forms a plasma of deposited metal between the conductors causing a short-circuit and destroying the resonant capabilities of the tag 10. A process by which the tag 28 may be deactivated is explained at length in U.S. Pat. No. 4,498,076.

The preferred process for fabricating the deactivatable tags 28 is set forth generally in U.S. Pat. No.

3,913,219 of G. Lichtblau, which is hereby incorporated by reference. One of ordinary skill in the art would understand that other similar processes may be used in keeping with the spirit and scope of the present invention.

Generally a roll of etched circuits which comprise a dielectric substrate covered on either side by a layer of conductors is joined with polymeric films which are carried on matrix carriers. Prior to joining of the polymeric films and the etched circuits, adhesive is applied to the surface of the polymeric films to be joined to the etched circuits. The etched circuits and films are joined by pressure applied by a pressure roll. The joined etched circuits and films together form a stabilized resonant tag web.

To form a deactivatable tag, adhesive 30 and polymeric film 26 are joined to the etched circuits and passed through a dimpling (indenting) roll in order to form the indented portions best shown in FIG. 3. The tag web is then coated with pressure sensitive adhesive 30 and joined to polymeric film 27, so that only the side of the tag having polymeric film 26, which is to be positioned away from the article, is dimpled.

The web and release liner 32 are passed between an anvil roll and a dye-cut cylinder in order to separate the matrix carriers from the polymeric films, the matrix carriers being collected on matrix rolls. The web is subsequently coated with a pressure sensitive adhesive 34 in order that a release liner 32 and optional thermal printing paper, if desired, may be joined to the web. The adhesive 34 may be of a pressure sensitive type, however one of ordinary skill in the art would understand that non-pressure sensitive adhesives may be used. The final web of resonant tag circuits may be stored on a roll.

The use of polymeric films 27, 26 is particularly advantageous in the present process because the polymeric films 27, 26 allow substantially consistent heat transfer in any portions of the tag fabrication process which may involve the application of heat. The consistent heat transfer characteristics are due in part to the uniformity in thickness obtainable by extrusion of the polymeric material. Other desirable advantages of using polymeric films 27, 26 include low moisture absorption which allows more consistent heat transfer, and high tensile strength which allows use of polymeric films 27, 26 each approximately 1 mil in thickness.

From the foregoing description, it can be seen that the present invention comprises a stabilized resonant tag circuit for use as an electronic article surveillance tag. It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention as defined by the appended claims.

We claim:

1. A resonant tag circuit for use as an electronic article surveillance tag, comprising:
   a flexible substantially planar dielectric substrate having a first side and a second side;
   a first conductor positioned on said first side of said dielectric substrate;
   a second conductor positioned on said second side of said dielectric substrate, wherein at least one of said conductors comprises an inductor; and
   a flexible, substantially planar, tear resistant, substantially vapor impermeable polymeric film adhered to and covering each of said conductors and said substrate on the side of each conductor opposite to the side which is positioned on said dielectric substrate, said film providing a substantially impermeable vapor barrier for each of said conductors and said substrate, whereby effects of body and article detuning on said circuit are minimized, and the secured integrity of said tag is promoted while maintaining the flexibility thereof.

2. A resonant tag circuit according to claim 1, whereby said polymeric film resists warping or shrinkage, thereby providing a substantially smooth, wrinkle-free printing surface, said printing surface being located on a side of said polymeric film opposite to a side which is positioned on said conductors and said substrate.

3. A resonant tag circuit according to claim 1, wherein said tag has a thickness not greater than about 12 mils.

4. A resonant tag circuit according to claim 1, wherein said dielectric substrate comprises a polymeric material.

5. A resonant tag circuit according to claim 4, wherein said dielectric substrate comprises polyethylene.

6. A resonant tag circuit according to claim 1, wherein at least one of said conductors comprises aluminum.

7. A resonant tag circuit according to claim 1, wherein said polymeric film is a polyester.

8. A resonant tag circuit according to claim 1, wherein said polymeric film has a thickness not greater than about 2 mils.

9. A resonant tag circuit according to claim 1, wherein said polymeric film has a moisture absorption less than about 0.8 percent.

10. A resonant tag circuit according to claim 1, wherein said polymeric film has a tensile strength greater than about 26,000 psi.

11. A resonant tag circuit according to claim 1, wherein an adhesive means adheres said polymeric film to each of said conductors and said substrate, said adhesive means having a thickness not greater than about 1.5 mils.

12. A resonant tag circuit according to claim 1, wherein said tag further comprises a release liner releasably adhered to said polymeric film.

13. A resonant tag circuit according to claim 1, having a predetermined resonant frequency for use as an electronic article surveillance tag, further comprising:
   means for deactivating said resonant tag circuit in response to an electromagnetic field of sufficient energy to destroy the resonant properties of said circuit, said deactivating means comprising a portion of at least one of said conductors which is indented into said substrate such that said conductors are closer to each other at said indented portion than the remainder of the conductor.

* * * * *

UNITED STATES PATENT AND TRADEMARK OFFICE
CERTIFICATE OF CORRECTION

PATENT NO. : 5,241,299
DATED : August 31, 1993
INVENTOR(S) : Lawrence C. Appalucci et al.

It is certified that error appears in the above-identified patent and that said Letters Patent is hereby corrected as shown below:

The title page should be deleted and substitute therefore the attached title page.

Delete drawing sheets 1 of 2 and substitute therefore the attached drawing sheets.

Signed and Sealed this

Twenty-fourth Day of January, 2006

JON W. DUDAS
*Director of the United States Patent and Trademark Office*

United States Patent [19]

Appalucci et al.

[11] Patent Number: 5,241,299
[45] Date of Patent: * Aug. 31, 1993

[54] STABILIZED RESONANT TAG CIRCUIT

[75] Inventors: Lawrence C. Appalucci, Villanova, Pa.; Luis F. Ortiz, Ponce, P.R.; Gary T. Mazoki, Sewell, N.J.

[73] Assignee: Checkpoint Systems, Inc., Thorofare, N.J.

[ * ] Notice: The portion of the term of this patent subsequent to Aug. 25, 2009 has been disclaimed.

[21] Appl. No.: 877,494

[22] Filed: Apr. 30, 1992

Related U.S. Application Data

[63] Continuation-in-part of Ser. No. 703,932, May 22, 1991, Pat. No. 5,142,270.

[51] Int. Cl.⁵ .................... G08B 13/14; H01Q 1/36
[52] U.S. Cl. .................................... 340/572; 343/895
[58] Field of Search ................ 340/572; 343/895; 333/175, 185; 336/200; 29/846, 842, 831, 829, 825; 156/274.2, 273.9, 272.2; 361/402, 395, 397–400; 427/96, 117, 123, 116

[56] References Cited

U.S. PATENT DOCUMENTS

| | | | |
|---|---|---|---|
| 3,913,219 | 10/1975 | Lichtblau | 29/592 |
| 4,021,705 | 5/1977 | Lichtblau | 361/402 |
| 4,250,398 | 2/1981 | Ellis et al. | 219/549 |
| 4,369,557 | 1/1983 | Vandebult | 29/25.42 |
| 4,413,254 | 11/1983 | Pinneo et al. | 340/572 |
| 4,471,344 | 9/1984 | Williams | 340/572 |
| 4,498,076 | 2/1985 | Lichtblau | 340/572 |
| 4,598,276 | 7/1986 | Tait | 340/572 |
| 4,700,179 | 10/1987 | Fancher | 340/572 |
| 4,717,438 | 1/1988 | Benge et al. | 156/152 |
| 4,778,552 | 10/1988 | Benge et al. | 156/272.2 |
| 4,783,646 | 11/1988 | Matsuzaki | 340/572 |
| 4,792,790 | 12/1988 | Reeb | 340/572 |
| 4,802,944 | 2/1989 | Benge | 156/247 |
| 4,818,312 | 4/1989 | Benge | 156/62 |
| 4,823,234 | 4/1989 | Konishi et al. | 361/395 X |
| 4,843,404 | 6/1989 | Benge et al. | 343/895 |
| 4,846,922 | 7/1989 | Benge et al. | 156/324 |
| 4,864,280 | 9/1989 | van der Meij | 340/572 |
| 4,910,499 | 3/1990 | Benge et al. | 340/572 |
| 4,940,966 | 7/1990 | Pettigrew et al. | 340/551 |
| 4,954,814 | 9/1990 | Benge | 340/572 |
| 4,960,651 | 10/1990 | Pettigrew et al. | 340/572 X |
| 4,990,891 | 2/1991 | Reeb | 340/572 |
| 5,142,270 | 8/1992 | Appalucci et al. | 340/572 |

Primary Examiner—Thomas Mullen
Attorney, Agent, or Firm—Panitch Schwarze Jacobs & Nadel

[57] ABSTRACT

The present invention is a stabilized resonant tag circuit for use as an electronic article surveillance tag. The tag has a flexible substantially planar dielectric substrate having conductors positioned on either side, at least one of the conductors including an inductor. The tag is stabilized by a flexible, substantially planar, tear-resistant, substantially vapor impermeable polymeric film adhered to and covering each of the conductors and the substrate. The film provides a vapor barrier which minimizes the effects of body and article detuning on the circuit and promotes the secured integrity of the tag. The tag circuit may include an indented portion in at least one of the conductors which permits the tag to be deactivated in response to an electromagnetic field of sufficient energy to destroy the resonant properties of the circuit.

13 Claims, 2 Drawing Sheets

UNITED STATES PATENT AND TRADEMARK OFFICE
CERTIFICATE OF CORRECTION

PATENT NO. : 5,241,299
DATED : August 31, 1993
INVENTOR(S) : Lawrence C. Appalucci et al.

It is certified that error appears in the above-identified patent and that said Letters Patent is hereby corrected as shown below:

The title page should be deleted and substitute therefore the attached title page.

Figure 4:
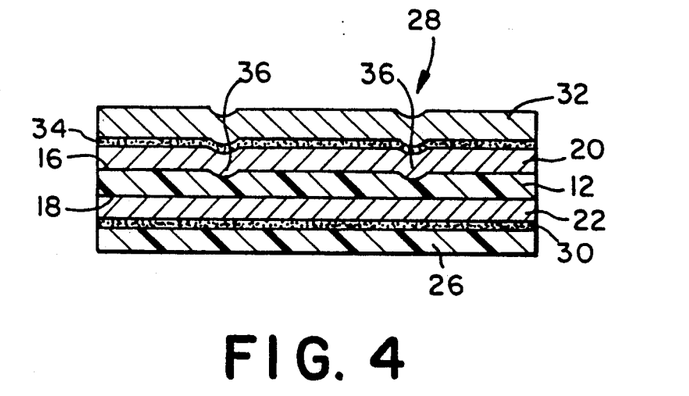

Delete drawing sheets 1 of 2 and substitute therefore the attached drawing sheet 1 of 1 and delete drawing sheet 2 of 2 consisting of FIG. 4.

This certificate supsersedes Certificate of Correction issued January 24, 2006.

Signed and Sealed this

Second Day of May, 2006

JON W. DUDAS
*Director of the United States Patent and Trademark Office*

United States Patent [19]

Appalucci et al.

[11] Patent Number: 5,241,299

[45] Date of Patent: * Aug. 31, 1993

[54] STABILIZED RESONANT TAG CIRCUIT

[75] Inventors: Lawrence C. Appalucci, Villanova, Pa.; Luis F. Ortiz, Ponce, P.R.; Gary T. Mazoki, Sewell, N.J.

[73] Assignee: Checkpoint Systems, Inc., Thorofare, N.J.

[*] Notice: The portion of the term of this patent subsequent to Aug. 25, 2009 has been disclaimed.

[21] Appl. No.: 877,494

[22] Filed: Apr. 30, 1992

Related U.S. Application Data

[63] Continuation-in-part of Ser. No. 703,932, May 22, 1991, Pat. No. 5,142,270.

[51] Int. Cl.⁵ .................. G08B 13/14; H01Q 1/36
[52] U.S. Cl. .................................... 340/572; 343/895
[58] Field of Search ................. 340/572; 343/895; 333/175, 185; 336/200; 29/846, 842, 831, 829, 825; 156/274.2, 273.9, 272.2; 361/402, 395, 397–400; 427/96, 117, 123, 116

[56] References Cited

U.S. PATENT DOCUMENTS

| | | | |
|---|---|---|---|
| 3,913,219 | 10/1975 | Lichtblau | 29/592 |
| 4,021,705 | 5/1977 | Lichtblau | 361/402 |
| 4,250,398 | 2/1981 | Ellis et al. | 219/549 |
| 4,369,557 | 1/1983 | Vandebult | 29/25.42 |
| 4,413,254 | 11/1983 | Pinneo et al. | 340/572 |
| 4,471,344 | 9/1984 | Williams | 340/572 |
| 4,498,076 | 2/1985 | Lichtblau | 340/572 |
| 4,598,276 | 7/1986 | Tait | 340/572 |
| 4,700,179 | 10/1987 | Fancher | 340/572 |
| 4,717,438 | 1/1988 | Benge et al. | 156/152 |
| 4,778,552 | 10/1988 | Benge et al. | 156/272.2 |
| 4,783,646 | 11/1988 | Matsuzaki | 340/572 |
| 4,792,790 | 12/1988 | Reeb | 340/572 |
| 4,802,944 | 2/1989 | Benge | 156/247 |
| 4,818,312 | 4/1989 | Benge | 156/62 |
| 4,823,234 | 4/1989 | Konishi et al. | 361/395 X |
| 4,843,404 | 6/1989 | Benge et al. | 343/895 |
| 4,846,922 | 7/1989 | Benge et al. | 156/324 |
| 4,864,280 | 9/1989 | van der Meij | 340/572 |
| 4,910,499 | 3/1990 | Benge et al. | 340/572 |
| 4,940,966 | 7/1990 | Pettigrew et al. | 340/551 |
| 4,954,814 | 9/1990 | Benge | 340/572 |
| 4,960,651 | 10/1990 | Pettigrew et al. | 340/572 X |
| 4,990,891 | 2/1991 | Reeb | 340/572 |
| 5,142,270 | 8/1992 | Appalucci et al. | 340/572 |

*Primary Examiner*—Thomas Mullen
*Attorney, Agent, or Firm*—Panitch Schwarze Jacobs & Nadel

[57] ABSTRACT

The present invention is a stabilized resonant tag circuit for use as an electronic article surveillance tag. The tag has a flexible substantially planar dielectric substrate having conductors positioned on either side, at least one of the conductors including an inductor. The tag is stabilized by a flexible, substantially planar, tear-resistant, substantially vapor impermeable polymeric film adhered to and covering each of the conductors and the substrate. The film provides a vapor barrier which minimizes the effects of body and article detuning on the circuit and promotes the secured integrity of the tag. The tag circuit may include an indented portion in at least one of the conductors which permits the tag to be deactivated in response to an electromagnetic field of sufficient energy to destroy the resonant properties of the circuit.

13 Claims, 1 Drawing Sheet